United States Patent
Draving et al.

(10) Patent No.: US 7,480,329 B2
(45) Date of Patent: Jan. 20, 2009

(54) METHOD OF FINDING DATA DEPENDENT TIMING AND VOLTAGE JITTER FOR DIFFERENT BITS IN AN ARBITRARY DIGITAL SIGNAL IN ACCORDANCE WITH SELECTED SURROUNDING BITS

(75) Inventors: Steven D. Draving, Colorado Springs, CO (US); Allen Montijo, Colorado Springs, CO (US)

(73) Assignee: Agilent Technologies, Inc., Santa Clara, CA (US)

( * ) Notice: Subject to any disclaimer, the term of this patent is extended or adjusted under 35 U.S.C. 154(b) by 640 days.

(21) Appl. No.: 10/978,103

(22) Filed: Oct. 29, 2004

(65) Prior Publication Data

US 2006/0093027 A1 May 4, 2006

(51) Int. Cl.
*H04B 3/46* (2006.01)
(52) U.S. Cl. ................................................. 375/226
(58) Field of Classification Search ................. 375/226
See application file for complete search history.

(56) References Cited

U.S. PATENT DOCUMENTS

| | | | | |
|---|---|---|---|---|
| 7,184,469 | B2* | 2/2007 | Joseph et al. | 375/224 |
| 7,203,610 | B2* | 4/2007 | Tabatabaei et al. | 702/69 |
| 7,254,168 | B2* | 8/2007 | Guenther | 375/226 |
| 2004/0001017 | A1* | 1/2004 | Chow | 341/155 |
| 2005/0125175 | A1* | 6/2005 | Murugan et al. | 702/69 |

* cited by examiner

*Primary Examiner*—Shuwang Liu
*Assistant Examiner*—David Huang (57) ABSTRACT

Separation and analysis of measured Total Jitter (TJ) begins with a suitably long arbitrary digital test pattern, from which an Acquisition Record is made. A Time Interval Error (TIE) or Voltage Level Error (VLE) Record is made of the Acquisition Record. A Template defines a collection of associated bit value or transitions that are nearby or otherwise related to a bit location of interest, and has associated therewith a collection of Descriptors and their respective Metrics. Each Descriptor identifies one of the various different patterns of bit value or transitions that fit the Template. The TIE/VLE Record is examined, and a parameter is measured for each instance of each Descriptor for the Template. The collection of measured parameters for each particular Descriptor are combined (e.g., averaging) to produce the Metric for that Descriptor. A Look-Up Table (LUT) addressed by the different possible Descriptors is loaded with the associated discovered Metric, which is a plausible value for Data Dependent Jitter (DDJ) at that bit. DDJ separates from TJ because DDJ is correlated with the Descriptors, while Periodic Jitter (PJ) and Random Jitter (RJ) can be expected to average to near zero over a sufficient number of instances of a given Descriptor. Identified instances of DDJ are individually removed from corresponding locations of TJ found for the entire waveform (the original TIE/VLE Record) to leave an Adjusted TIE/VLE Record that is PJ convolved with RJ.

11 Claims, 9 Drawing Sheets

FIG. 9

METHOD OF FINDING DATA DEPENDENT TIMING AND VOLTAGE JITTER FOR DIFFERENT BITS IN AN ARBITRARY DIGITAL SIGNAL IN ACCORDANCE WITH SELECTED SURROUNDING BITS

REFERENCE TO RELATED PATENTS

The subject matter of this patent application is related to that of U.S. patent application Ser. No. 10/354,598 entitled CHARACTERIZING JITTER OF REPETITIVE PATTERNS filed 29 Jan. 2003 by Roger Lee Jungerman and assigned to Agilent Technologies, Inc. For the sake of brevity CHARACTERIZING JITTER OF REPETITIVE PATTERNS is hereby incorporated herein by reference. The subject matter of this patent application is also related to that of U.S. patent application Ser. No. 10/685,027 entitled METHOD AND APPARATUS FOR DECOMPOSING SIGNAL JITTER USING MULTIPLE ACQUISITIONS filed 14 Aug. 2003 by Steven D. Draving and assigned to Agilent Technologies, Inc. For the sake of brevity METHOD AND APPARATUS FOR DECOMPOSING SIGNAL JITTER USING MULTIPLE ACQUISITIONS is also hereby incorporated herein by reference. The subject matter of this patent application is further related to that of U.S. patent application Ser. No. 10/929,194 entitled METHOD AND APPARATUS USE RE-SAMPLED TIE RECORDS TO CHARACTERIZE JITTER IN A DIGITAL SIGNAL filed 30 Aug. 2004 by Steven D. Draving and Allen Montijo and assigned to Agilent Technologies, Inc. For the sake of brevity METHOD AND APPARATUS USE RE-SAMPLED TIE RECORDS TO CHARACTERIZE JITTER IN A DIGITAL SIGNAL is also hereby incorporated herein by reference.

BACKGROUND OF THE INVENTION

High speed digital systems, whether for computational or communications purposes, rely on the ability to correctly ascertain the logical value of a binary data signal at specific times. A series of such consecutive logical values will represent either data or control information, and if satisfactory performance is to be achieved in a modern high speed system the error rate in ascertaining the logical values may need to be very low, often only one error in $10^{12}$ bits, or even less. In a digital system there are abrupt transitions between the logical values, and the nominal period of time that the data signal represents a particular logical value is called the UI (for Unit Interval). Generally there is provided (or derived) another signal, called a clock signal, whose period is also the UI and whose abrupt transitions in a selected direction serve as the 'specific times' (mentioned above) at which the logical value of the data signal is to be ascertained, a process often termed 'sampling.'

In an ideal world, all edges in the data signal would occur at locations along a time axis that were an exact UI apart, or at exact multiples of the unit interval. Likewise, the transitions in the clock signal would always occur at locations along the time axis that describe exactly a series of consecutive unit intervals. It is common for the phase of the clock signal to be adjusted relative to the transitions in the data signal such that the sampling according to the clock signal will occur in the middle of the unit interval of the data signal. That is, while the UI of the data signal is the same as the UI of the clock signal, their edges don't coincide, but are instead staggered.

The 'rattle' in the edges of a signal that is supposed to transition only at particular times (here, at the expiration of consecutive unit intervals) is called jitter. In today's high performance digital systems, the presence of jitter in the data signal and in the clock has a significant effect on the system's ability to correctly ascertain the logical value of the data signal. There are other error causing mechanisms, to be sure, but if a high speed digital system is to offer good performance it needs to have low jitter (say, 1/1000 UI RMS, or less).

To reduce jitter one generally has to locate its source, and it turns out that it is useful and productive to recognize several different types of jitter. It is now common for test equipment intended for use with high performance digital systems to include in their repertoire of operations automated measurements of jitter, and to do so while recognizing several different types of jitter, each of which can be separately characterized. Total jitter is the aggregate amount of observable jitter, and is (or ought to be) the 'sum' of all the various types of component jitter that can be recognized.

There are wide variations among techniques for jitter measurement. In particular, there are some 'brute force' techniques that perform all of N-many trials, and which can seem to take forever (hours, or even days!) to get accurate results having resolution in parts in $10^{12}$. Even if the UI is one nanosecond, it still takes over twenty minutes to measure $10^{12}$ of them. And some techniques require N-many repetitions of a suitable test pattern that is in the range of one hundred or a thousand UI in length. Clearly, such brute force approaches are not suitable for quickly characterizing expected low rates of jitter.

Various strategies have been developed to cope with this situation. These often revolve around assuming that some of the jitter is random in nature, with the rest arising from various other mechanisms. The idea is that, if the nature of a component source of jitter is known, then it can be represented by a suitable model. The significance of this is that, while the model needs coefficients to produce greater or lesser amounts of jitter, the shape of the probability distribution of that jitter component is specific to the model, so that the particular coefficients for a specific instance can be found by curve fitting techniques operating on a proper collection of samples. The plan (for, say, random jitter) is to sample for a reasonable amount of time, do a curve fit to instantiate the model, and then let the model predict with some confidence what we would get if we let the measurement run to conclusion using brute force techniques. Clearly, if that is the plan, then we need to have at hand data that represents only that one kind of jitter; otherwise the model will be inaccurate.

Now a new set of difficulties arises. The measured data will contain the effects of all the different types of jitter. These include Periodic Jitter, Random Jitter and Data Dependent Jitter that is correlated with the content of the data itself. It is not possible to readily directly measure samples that pertain to only a particular component type of jitter, since we can't observe those types in isolation: the measured data will generally include the combined effects of all types of jitter. Not only must indirect methods be developed to separate from the combined result the data for individual types of jitter (so that models or other analysis can be applied to appropriate data), but there is more than one way to decompose into components the combined jitter that is actually measured.

We are particularly interested here in a jitter measurement technique for discovering Data Dependent Jitter and that is useable in a real time Digital. Sampling Oscilloscope (DSO) or comparable environment to produce credible and valid results in seconds instead of hours. While there are various techniques that are known for measuring Total Jitter and separating out Data Dependent Jitter, each suffers from some disadvantage. For example, one technique operates quickly, but does not preserve observed frequency information for Periodic Jitter, which is useful diagnostic information for an attempt to eliminate such jitter. As a second example, another technique does not readily allow the combining of multiple measurements to obtain a more accurate answer. Still another disadvantage of some conventional techniques is that they require repetitions of a particular test signal, and may not accommodate an arbitrarily long test sequence. This means the system must, at least to some degree, be removed from service for testing. There is a need for a Data Dependent Jitter measurement technique using a real time DSO or Timing Analyzer that operates quickly, preserves useful ancillary information, whose resolution scales with longer measurement times, and that tolerates a test sequence of arbitrary length and content that might either be random or be actual 'live' data measured while the system was in operational use. It should also be able to measure not only the timing jitter of edges in the signal, but also characterize voltage variations exhibited in the asserted logic levels (HIGH/LOW, TRUE/FALSE). What to do?

SUMMARY OF THE INVENTION

Measurement, separation and analysis of Data Dependent Jitter in a System Under Test begins with the production of a suitably long digital arbitrary Test Pattern which may contain a random sequence of bit values, or, which might be actual live data. An Acquisition Record is made of the entire arbitrary test pattern. (That is to say, the digital data may be sampled using the techniques found in modern high speed real time DSOs, in which case a suitably dense representation of the actual analog waveform of the sampled digital signal is reconstructed with Digital Signal Processing (DSP) techniques, and the sequence of logical values found from inspection of that reconstruction. Alternatively, a high speed timing analyzer can directly provide the Acquisition Record from accurately noted time of edge occurrence and direction of transition information that arises from actual hardware-based threshold comparison, and no reconstruction is required.) For analysis of timing jitter, a complete Time Interval Error (TIE) Record is made from an inspection of the locations of the edges in the Acquisition Record. This may be accomplished with the help of an associated clock signal that either accompanies the data signal of interest or that is derived therefrom. Analysis of voltage jitter (noise) is possible for Acquisition Records that are reconstructions of the actual analog behavior of the Test Pattern. To accommodate that analysis a Voltage Level Error (VLE) Record is created that is comparable to a TIE Record.

A user of a jitter analyzer defines a Template that is a collection of associated bit behaviors at bit locations that are nearby or otherwise related to a (reference) bit location of interest, but whose locations need not be contiguous or adjacent. Bits have values, and when consecutive bit locations have different values there is an edge separating them, which will be a transition that is either rising or falling. A Template can be defined as either bit values or as transitions. Since edges and transitions occur between bit locations, it will be convenient to associate an edge or transition with the bit location that follows it. This will allow us to adopt a less cumbersome terminology that embraces both bit values and transitions. (And, it would not matter if we adopted the convention that an edge or transition was associated with the bit location that preceded it, so long as we were consistent about it.) So, our 'bit behaviors at bit locations' are either bit values or transitions, or, perhaps a mixture of both. Examples of a Template might be the two bit values (or transitions) before and the two bit values (or transitions) after the bit value (or transition) of interest, or, the three bit values (or transitions) prior to the one of interest. The nature of the expected source of jitter may influence the nature of the Template. An electrical structure involving a transmission line that is causing reflections might use a Template having groups of one or several bits where the groups are separated by a number of bit positions; the accumulated Unit Intervals for the separating bit positions is related to the length and propagation velocity along the transmission line.

A Template has associated therewith a collection of Descriptors and their respective Metrics. Each Descriptor identifies one of the various different patterns of bit values (or transitions) that fit the Template. For example, the 'two before/two after' bit value Template can have (at most) thirty-two different ways that it can occur ('two before' plus 'two after' plus the one of interest that is 'in the middle' is five two-valued bits, for $2^5=32$ different patterns, although a need for an edge to occur can cut the number of possibilities in half). Bit transition information is three-valued (rising edge, falling edge, or no change) so a 'one on either side' transition Template could have at most $3^3=27$ different instantiations, although not all these are realizable, since two consecutive transitions in the same direction are not allowed in conventional two-valued (binary) digital systems. (It will be noted that any desired legitimate transition Template can also be expressed as a collection of one or more corresponding bit value Templates.) In any event, the complete TIE Record (or VLE Record) is examined in conjunction with a reconstruction (Acquisition Record) of the actual waveform of the Test Pattern, and the various instances of the same Descriptor are noted in the reconstructed waveform, for each different Descriptor. A parameter associated with the Template is measured from the TIE or VLE Record for each instance of each Descriptor in the Template. For example, the signed amount of TIE for the bit position of interest that locates the position of the Template along the waveform might be such a parameter. The collection of measured parameters for each particular Descriptor are combined (e.g., averaging) to produce the Metric for that Descriptor. A Look-Up Table (LUT) addressed by the different possible Descriptors is loaded with the discovered Metric that is associated with each Descriptor.

Such a LUT can be used to separate Total Jitter (TJ) into one portion that is Data Dependent Jitter (DDJ) and into another portion that is Periodic Jitter (PJ) convolved with Random Jitter (RJ). The separation works because: (1) Total Jitter is the 'sum' of those two portions and no others; and (2) DDJ is correlated with the Descriptors, while PJ and RJ (and thus also their convolution) can be expected to average to near zero over a sufficient number of instances of a given Descriptor. That condition of 'self-cancellation' can be expected to obtain if the test pattern is long compared to the size of the Template. Once that LUT is created a plausible value of DDJ can be imputed to each bit position in the test pattern by using the Descriptor associated with that bit position as an index to address the LUT and obtain the Metric stored therein. DDJ for timing jitter involves using bit positions that have edges, while DDJ for voltage noise does not require that there be an edge at a bit position. The identified instances of DDJ can then be individually removed from the corresponding locations of the original TIE/VLE Record for the measured TJ to produce an Adjusted TIE/VLE Record representing PJ convolved with RJ, and conventional techniques may then be used to perform further separation and analysis for that jitter present in the remaining difference.

The LUT could be replaced with a closed form computational rule that used as its input variables an ordered numerical representation of the various Descriptors, and that when evaluated produced the Metric that would otherwise have been stored in the LUT for the corresponding Descriptor. Such a computational rule can be found with conventional curve fitting techniques once the various Metrics have been found.

DESCRIPTION OF A PREFERRED EMBODIMENT

Figure 1:
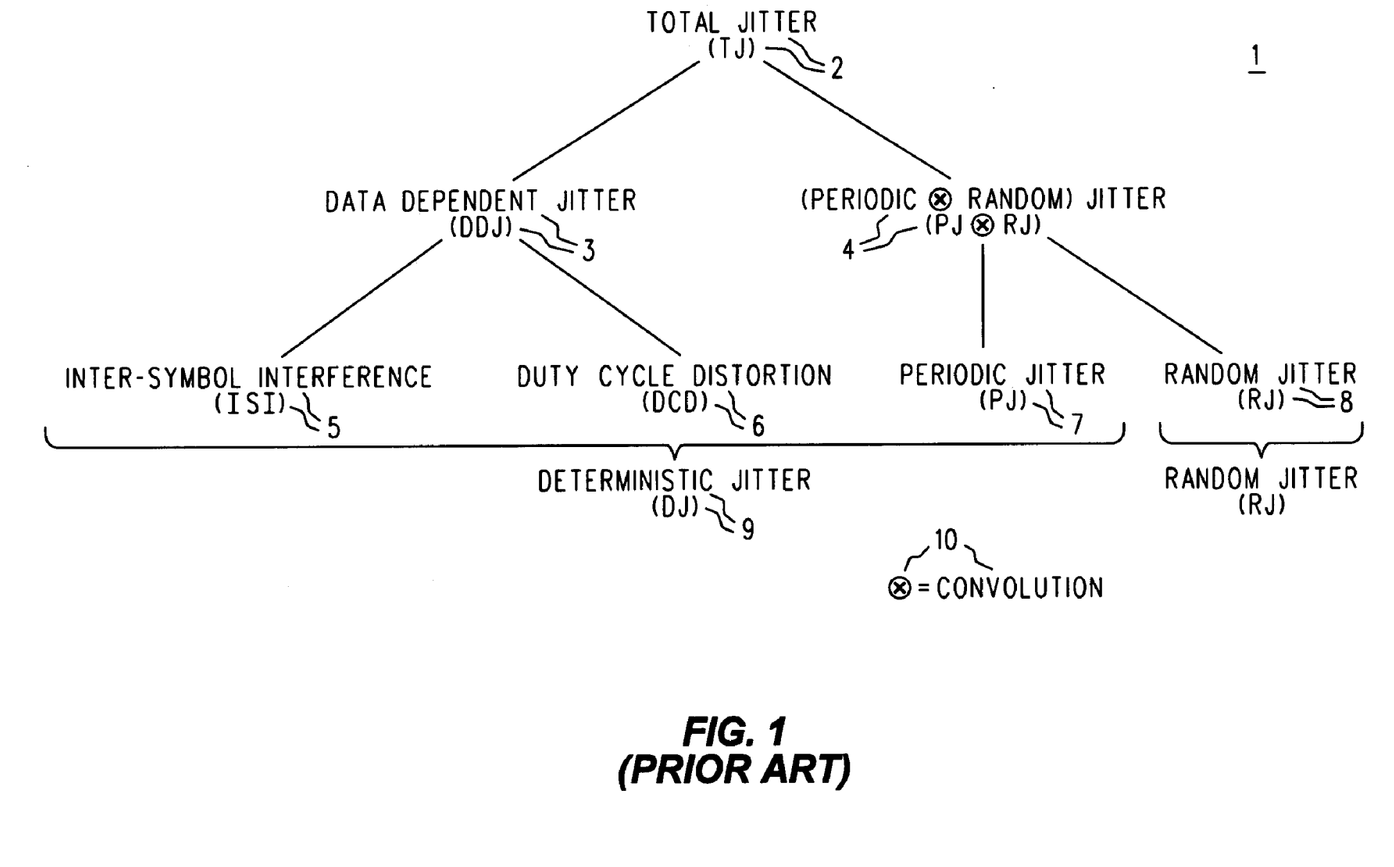
FIG. 1 is a prior art diagram illustrating a preferred manner of decomposing total jitter into deterministic jitter and random jitter.

Refer now to FIG. 1, wherein are shown some relationships between the various types of jitter with which we shall be concerned. FIG. 1 is a diagram 1 describing a paradigm we shall use in understanding jitter. It begins at the top with the notion that there is something called TJ (Total Jitter) 2. It represents all the aggregate jitter that is present in the system being measured. It is the thing that, while in principle can be measured by direct observation, takes too long to discover by such a brute force method. It will be appreciated that wherever we use the term 'jitter' it applies to either timing jitter or voltage jitter (noise), unless there is, either specifically or through the context, an indication that only one or the other is meant.

In the paradigm of FIG. 1, TJ 2 is composed exactly of two component parts, one of which we call DDJ 3 (Data Dependent Jitter) and the other of which is the combination (4) of PJ⊗RJ. This combination 4 is of Periodic Jitter (PJ) 7 convolved with Random Jitter (RJ) 8. Note that both representations describe probability density functions. This leads us to the observation, which will be familiar to those who operate with probabilities, that the proper method of combining, or summing, two probability density functions such as 7 and 8 is convolution, which operation is indicated by the symbol ⊗ (10).

RJ 8 is assumed to arise for inescapable natural reasons, after the fashion of thermal noise or quantum effects, and is further assumed to be Gaussian in nature. PJ 7 is jitter that has a strong periodic content, say, for example, that a strong periodic signal from another system is coupled via cross talk into the system being measured. It might have no correlation whatsoever to the SUT (System Under Test), but is nevertheless regular. And while the presence of PJ in our paradigm allows for this sort of thing, we don't demand that it actually be there. That is, in some SUTs there might not be any detectable PJ.

The other component of TJ 2 is DDJ 3. This is jitter that is caused by, or is correlated with, the particular patterns of bits in the data being transmitted. It turns out that there are mechanisms that allow what has already been sent, or that will be sent, to affect the reception of the bit currently being received. ('Already been sent' seems benign enough; perhaps local heating or cooling related to certain activity in the data disturbs thresholds or alters rise or fall times. But 'will be sent' might seems as if it requires an effect to precede its cause. Not to worry. The idea is that a complex transmitting mechanism, such as a SERDES, say, has a highly pipelined parallel architecture with busses interconnecting FIFOs and registers all susceptible to cross talk, and that the complex transmitting mechanism DOES ALREADY CONTAIN the evil data that is the 'cause.' That data just hasn't been sent yet over the transmission path to the receiver, and the jitter will get into the data as it is sent. Thus, causation still precedes its effect, and no mysterious metaphysics is required.) Since these phenomena are already reported in the literature, we needn't dwell on them further. One measure of such DDJ is ISI 5 (Inter-Symbol Interference) and another is DCD 6 (Duty Cycle Distortion). Those seeking further information about these measures of jitter are referred to the incorporated patent applications and the product literature cited in the incorporated METHOD AND APPARATUS USE RE-SAMPLED TIE RECORDS TO CHARACTERIZE JITTER IN A DIGITAL SIGNAL.

Finally, we group ISI, DCD and PJ together as DJ 9 (Deterministic Jitter). It will be appreciated that while the DDJ portion of DJ is separable into ISI and DCD, those components are not necessarily independent nor mutually exclusive, and they generally do not combine by convolution. In any event, the intent of this grouping is that DJ 9 is all jitter that is not truly random in nature (RJ, 8), but that is either somehow correlated with the data, or is downright periodic, which in neither case fits our intuitive notion of 'random.' An important difference between RJ and DJ is that RJ has (in principle) a PDF (Probability Density Function) with an infinite domain, while DJ has a PDF whose domain is bounded.

Figure 2:
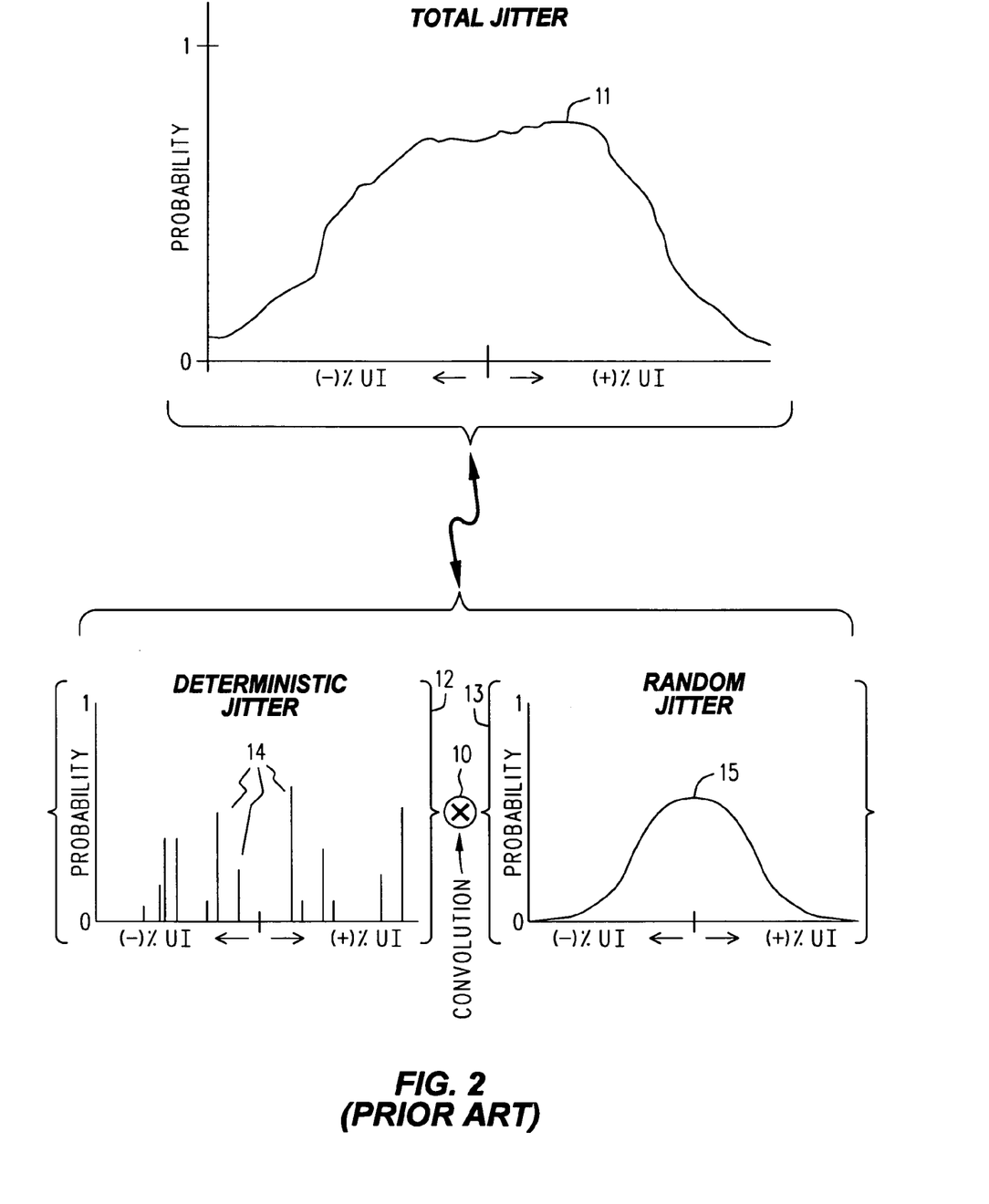
FIG. 2 is a prior art diagram illustrating that a histogram representing total jitter can be decomposed into separate probability distributions representing deterministic jitter and random jitter.

Refer now to FIG. 2, wherein is shown a histogram 11 representative of Total Jitter. Total jitter is the actual aggregate amount of jitter the system exhibits, from whatever source. It is what is directly measurable, although it generally takes way too long to do so directly for the small amounts of jitter that are at present considered reasonable. Histogram 11 is not one that has been directly obtained by brute force measurements, although suppose for a moment that it is. Such a histogram is indeed an item that we would like to have (even if we don't actually have it), and we are showing it (11) in the abstract and in the spirit of saying "Well, there exists some histogram that describes the total jitter, and let's suppose that this (11) is it." It is a histogram of probability versus percent error in UI. That is, the amounts of jitter, while they could be described as absolute times, are instead described as position errors that are early or late arrivals in terms of the UI. The probability axis represents the likelihood that an edge occurred with that amount of position error. Now, in this regard, it may be tempting to think that the only possible errors are fractions of a UI. For some systems this would be a reasonable assumption. But we are operating at very high speeds for data streams of significant length. A slight drift in the data rate can accumulate errors to produce a transition location having more than a UI of error, when compared to the ideal correct time of signal transition.

To continue, then, our plan is to assert that there exists some histogram 11 describing Total Jitter, and argue that, whatever it is, that Total Jitter can be decomposed into Random Jitter and Deterministic Jitter. That is, we will assume that such a decomposition is a true partition of the Total Jitter: i.e., any type of jitter is either in one category or the other, and that none is in both. This leads us to assert that there is some representation 12 for Deterministic Jitter 9 that can be combined with a representation 13 for Random Jitter 8 that "adds up to" the histogram 11 for the Total Jitter. We note that we expect the Deterministic Jitter to usually be discrete and static, as indicated by the collection of spectra-like lines 14 (note we are not accusing them of being spectral components in the signal . . . just that their shapes resemble a displayed spectra). We also expect the Random Jitter to follow some plausible distribution found in nature, such as a Gaussian one represented by distribution 15.

Figure 3:
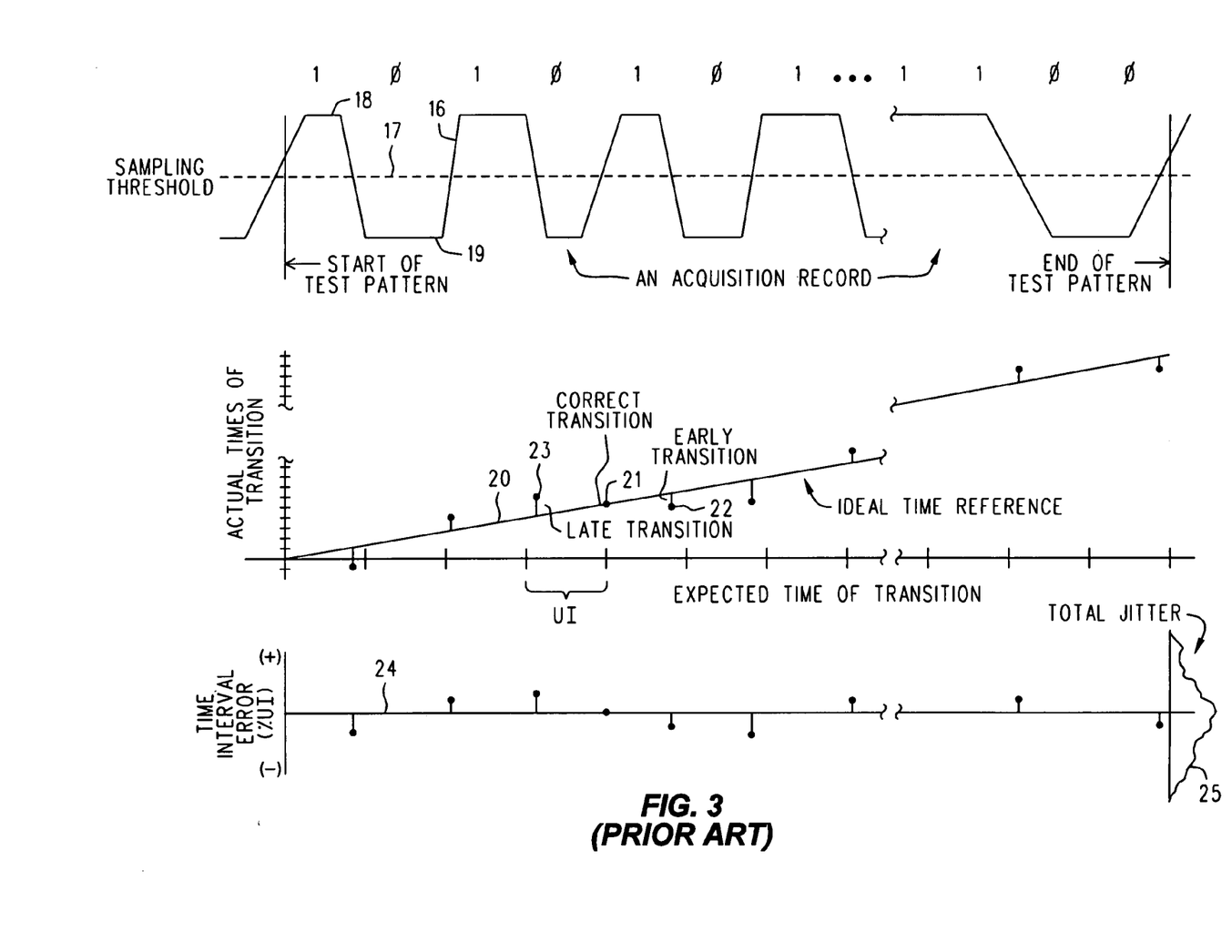
FIG. 3 is a prior art diagram illustrating the notion of a TIE Record for a Data Acquisition Record and a prior art histogram produced therefrom to estimate total jitter.

In FIG. 3 an acquired data waveform 16 is depicted, along with a threshold 17 against which the data waveform 16 is compared for determining the logical values of TRUE and FALSE in a test pattern. In this example, the portion 18 of data signal 1 conveys a logical value of TRUE (a logic ONE), while portion 19 conveys a logical value of FALSE (a logic ZERO). We are not in this figure indicating how the time variant waveform of the data signal 16 is measured. That can be done in different ways, depending upon the nature of the test equipment. As an example that we are interested in, a real time DSO would digitize discrete sampled locations of the waveform at known times therealong. (It will be appreciated that for high speed signals there may be only ten or less samples per cycle, but that this does not present a problem, since the 'scope relies on a DSP (Digital Signal Processing) implemented reconstruction filter protected by the Nyquist limit to 'fill in the dots.') In any event, the test equipment would ultimately have in its acquisition memory a data structure called an Acquisition Record that represents the waveform of the data signal. We also are not in this figure indicating how the logical pattern in use is discovered from the reconstructed waveform according to the relationship between the waveform of the data signal 16 and the threshold 17. The pattern might, by simple agreement, be known ahead of time. To enforce that might, however, be quite inconvenient. Post processing by the DSO of the Acquisition Record 1 can reveal the sequence of logical values it contains, should that be desirable (which for us it will be). Another possibility is coupling the input signal to an actual hardware comparator having an actual threshold that produces an actual collection of logical ONEs and ZEROs from time stamped transitions (which would be how a Timing Analyzer acquires data, and in which case there probably would not be any separate samples that need DSP).

To continue in the DSO case, the samples representing the Acquisition Record 16 can be processed with DSP techniques and/or interpolation to discover with suitable precision the locations along a time axis when an edge in the data signal crossed the threshold 17. With a correctly set threshold (very probably one set in the middle of the signal's voltage excursion), jitter, if it is present, will cause the time locations of the threshold crossings to vary from the ideal sequence of consecutive U's. This is shown in the middle portion of the figure, wherein is depicted an ideal time reference line 20, appended to which are indications of correct (21), early (22) and late (23) transitions. The length of these appendages is indicative of the degree of error. It is clear that if a Timing Analyzer provided time stamped transition data (as opposed to a DSO's digitized samples), the same correct/early/late actual time of transition information can be produced.

The process of discovering the Time Interval Error for an edge involves knowledge of what the UI ought to be, and that information might arise from how a clock signal that is supplied by the SUT, or that is recovered from its data, exhibits a transition in a particular direction. It might involve the phase locking of a time base in the DSO or Timing Analyzer to one in the SUT, since even precision laboratory grade time bases that are independent can be expected to drift relative to one another by amounts that correspond to significant amounts of jitter in a high speed system.

As an aside, we wish to point out that, although FIG. 3 is drawn as though each ideal UI is expected to be the same length of time, this need not be the case. There are systems where the UI varies on purpose. If we were to measure jitter in such a system we would presumably be informed about the nature of such variations, and could still correctly determine the errors that occur. We might then normalize these errors to be expressed as a percentage of expected UI, so that the members of a collection of such transition data are commensurable.

The bottom portion of FIG. 3 is a representation of a TIE (Time Interval Error) Record 24 that is prepared from the information depicted in the parts of the figure already described. The TIE Record is a description of the observed jitter, and corresponds to total jitter. Upon reflection, it will be appreciated that such a TIE record 24 is, in terms of information content, superior to a histogram, such as 11 in FIG. 2, in that actual instances of jitter are still embedded in their surrounding circumstances. (This is not to impugn the utility of the histogram 11; it readily conveys useful information by its shape that remains concealed within a TIE record such as 24.) One prior art technique, described in the incorporated METHOD AND APPARATUS FOR DECOMPOSING SIGNAL JITTER USING MULTIPLE ACQUISITIONS constructs a histogram (25) from the TIE data, and then uses that histogram as the basis for a model from which to make estimates of other types of jitter.

Henceforth, when we refer to a TIE Record, we shall have in mind a data structure implemented in the memory of suitable test equipment, such as a real time DSO or Timing Analyzer, which contains time interval error information of the sort depicted in the lower third of FIG. 3 (although without the histogram at the right-hand end), and that has been derived from circumstances similar to those set out in the top two portions of that figure.

Figure 4:
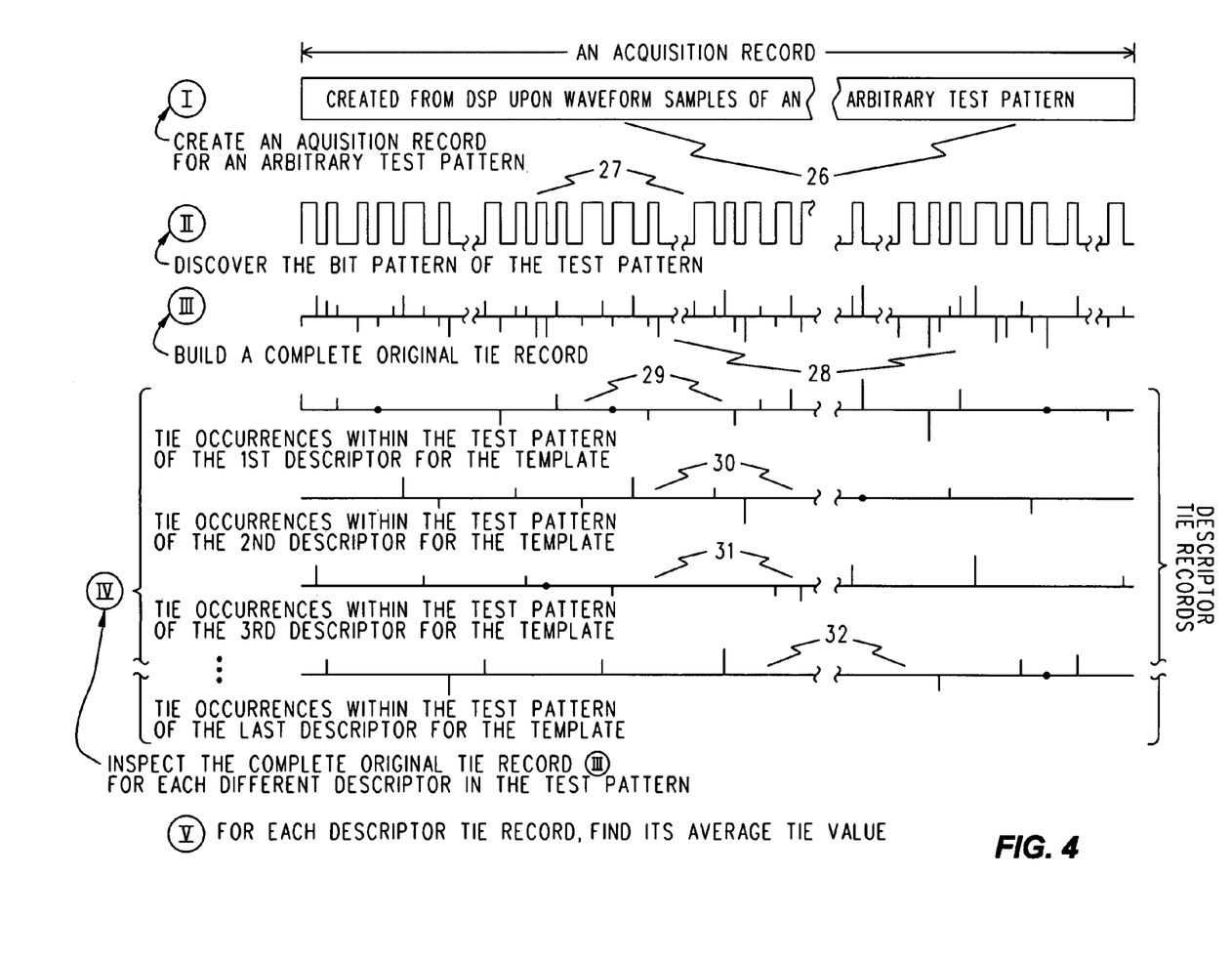
FIG. 4 is a diagram illustrating the production of an Acquisition Record arising from the sampling of digitized values or the discovery of transitions through comparison against a threshold and the subsequent production therefrom of a collection of Descriptor TIE Records associated with a specified Template.

Now refer to FIG. 4, which is a diagram illustrating a series of steps that are performed in accordance with the principles of the invention to discover a description of DDJ, allow its use and subsequent removal from a description of measured TJ in pursuit of further analysis of PJ convolved with RJ. In Step I an arbitrary Test Pattern is represented in an Acquisition Record 26 as either consecutive samples meeting the Nyquist requirements or as consecutive directed transitions. This Acquisition Record 26 is created by a suitable measurement process, and is the basis for the jitter measurements to follow. The Test Pattern is, in principle, arbitrary, in that it may be random data, live data or some other favorite sequence of bits prized for some special property. What is really required is that the Test Pattern be 'long' in comparison to patterns that produce DDJ and that it include a reasonable and fair number of the various bit sequences in the data that the SUT is expected to cope with. Pseudo random data is usually ideal for this purpose, although it is believed that live data generally works about as well provided that a long enough Acquisition Record is obtained. It won't generally be harmful if the data includes lopsided distributions of particular bit patterns, so long as others that are of interest are present in sufficient respective instances to provide the necessary degree of self-cancellation for PJ and RJ. The technique to be described does not rely on the notion that all instances of self-cancellation are equally good (not even pseudo random data will always guarantee that); it only requires that the self-cancellation for each instance is 'good enough.'

In Step II the bit pattern 27 for the arbitrary Test Pattern is discovered, if it is not already known. For example, the discovery may be made in a real time DSO environment, where the Acquisition Record is consecutive digitized samples, by applying DSP to those samples to obtain a rendered result that is suitably dense and then comparing that against a threshold that is, say, midway between average maximum and average minimum values.

In Step III a complete Original TIE Record 28 is created from an inspection of the bit pattern produced in Step II. As described in connection with the bottom portion of FIG. 3, each edge in the Test Pattern gets a signed value that is the error in expected time of occurrence for that edge. Ascending lines indicate late transitions, descending lines represent early transitions, while in each case the length of the lines represents the amount of the error. A dot indicates a zero length line, and no error for the corresponding edge. Of course, the TIE Record is numerical data stored in a memory-based data structure, and is not actually stored as an image as is seen in the figure. (It will naturally be appreciated that the image in the figure is merely a convenient way to indicate the kind of information that is in the data structure.)

Now consider Step IV. Assuming that the user, or some other agency, has specified a Template that can be understood as a collection of either bit patterns or transitions in the Test Pattern, there will be a Descriptor that identifies each member of such a collection defined by the Template. As mentioned in the Summary Of The Invention, examples of a Template might be the two bit values/transitions before and the two bit values/transitions after the bit value/transition of interest, or, the three bit values/transitions prior to the one of interest. The nature of the expected source of jitter may influence the nature of the Template. An electrical structure involving a transmission line that is causing reflections might use a Template having groups of one or several bits where the groups are separated by a number of bit positions, such that the accumulation of Unit Intervals for the separating bit positions is related to the length and propagation velocity along the transmission line. Each Descriptor identifies one of the various different patterns of bit values/transitions that fit the Template. For example, the 'two before/at/two after' bit value Template can have thirty-two different ways that it can occur ('two before' plus 'two after' plus the one of interest that is 'at' is five two-valued bits, for $2^5$=32 different patterns). Upon reflection it will be appreciated that such a Template, when used for a voltage jitter (noise) measurement, can indeed have all thirty-two different values. There can be voltage noise for the 'at' bit even when one or both adjacent bit locations have the same bit value as the 'at' bit (i.e., there is not an 'at' edge).

On the other hand, a timing jitter measurement for an 'at' bit requires that it have an edge (only an edge can undergo timing jitter!), which removes some bit patterns from the thirty-two. In particular, the one-one and zero-zero combinations of an 'at' bit and its predecessor would never be accompanied by an intervening edge. So, the usual factor of four that would ordinarily correspond to those two bits is replaced by a factor of only two: one for the one-zero combination plus one for the zero-one combination. This is a reduction by half, so in this example there will be at most sixteen Descriptors that will be associated with actual timing jitter measurements.

Bit position transition information is three-valued (rising edge, falling edge, or no change) so a 'one on either side' transition Template could have at most $3^3$=27 different instantiations, although not all these are realizable, either, since two consecutive transitions in the same direction are not allowed in conventional two-valued (binary) digital systems. (It will be noted that any desired legitimate transition Template can also be expressed as a collection of one or more corresponding bit value Templates.)

The essence of Step IV is to find from an inspection of the Original TIE Record 28 in conjunction with the Acquisition Record 26, and for each Descriptor, a usable TIE-like record of what the value of some parameter of interest is for each instance of that (each) Descriptor. A useful parameter is the TIE value for the edge at the location associated with that instance of the Descriptor. Let us call these 'Descriptor TIE Records' (29-32). There will be one such Descriptor TIE Record for each Descriptor. (Unless, of course, some Descriptors never occurred in the data—a fact probably worth reporting to the operator, as it suggests either that the Test Pattern is not robust or that the Template is overly ambitious . . . .) It will be noted that the TIE amounts in any one of the Records 29-32 are generally not equal. That is because they will individually also include the effects of RJ and PJ. It is NOT expected that they differ owing to varying amounts of DDJ. DDJ ought to be essentially the same for each TIE value in one such record, as that is the purpose of identifying Descriptors in the first place. If there are different instances of Data Dependence in DDJ, they are expected to be associated with different Descriptors! If they aren't, then a different (and perhaps more complicated?) Template is in order. (That is, it could happen that the mechanism causing DDJ has more 'internal states' than the Template has Descriptors.)

Accordingly, in Step V we average the individual TIE values in each of the Descriptor TIE Records 29-32 to produce a respective collection of Metrics. Each Metric in the collection is associated with a respective Descriptor. The averaging removes the jitter owing to RJ and PJ, leaving just the different values of DDJ for each of the various Descriptors.

Figure 5:
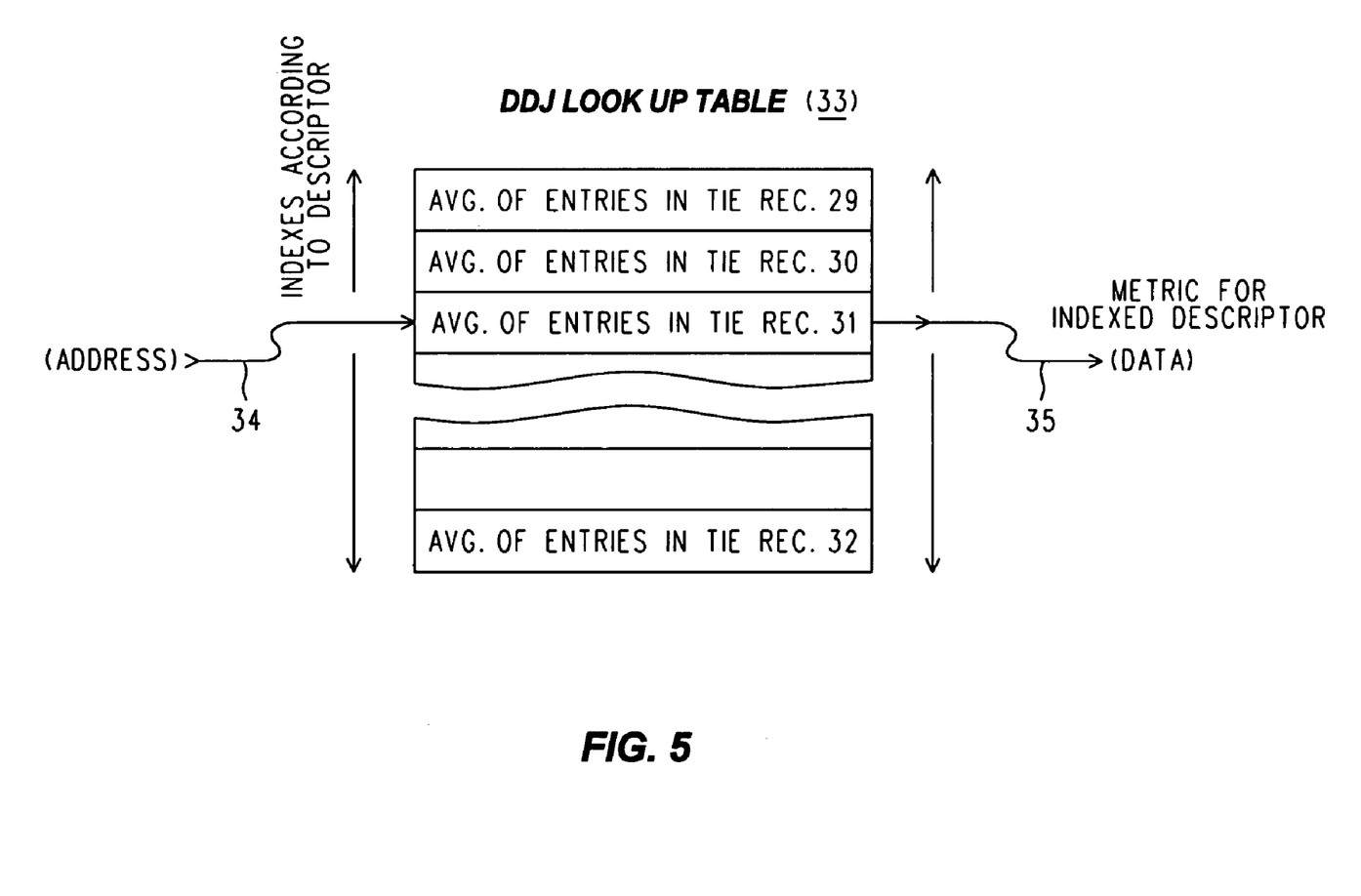
FIG. 5 is an illustration of a Look Up Table that associates a Metric for DDJ with the various Descriptors that occur for the specified Template.

In FIG. 5 a Look Up Table (LUT) 33 is shown that is indexed or addressed by symbols or encoding that represent the various Descriptors. So, for example, if the Template were the bit pattern of the two bits before and the two bits after a bit of interest, there would (at most) need to be $2^5$=32 different entries in the LUT 33, and the simplest way to index those entries would be to do it using those five bits as the Least Significant Bit (LSB) portion of an address (34) applied to the segment of memory used to create the table. Of course, what is loaded into the LUT, and subsequently read out from those indexed locations, are the Metrics (averaged values) 35 from the Descriptor TIE Records 29-32 (that is, the discovered respective values of DDJ for the Descriptors associated with the specified Template).

Figure 6:
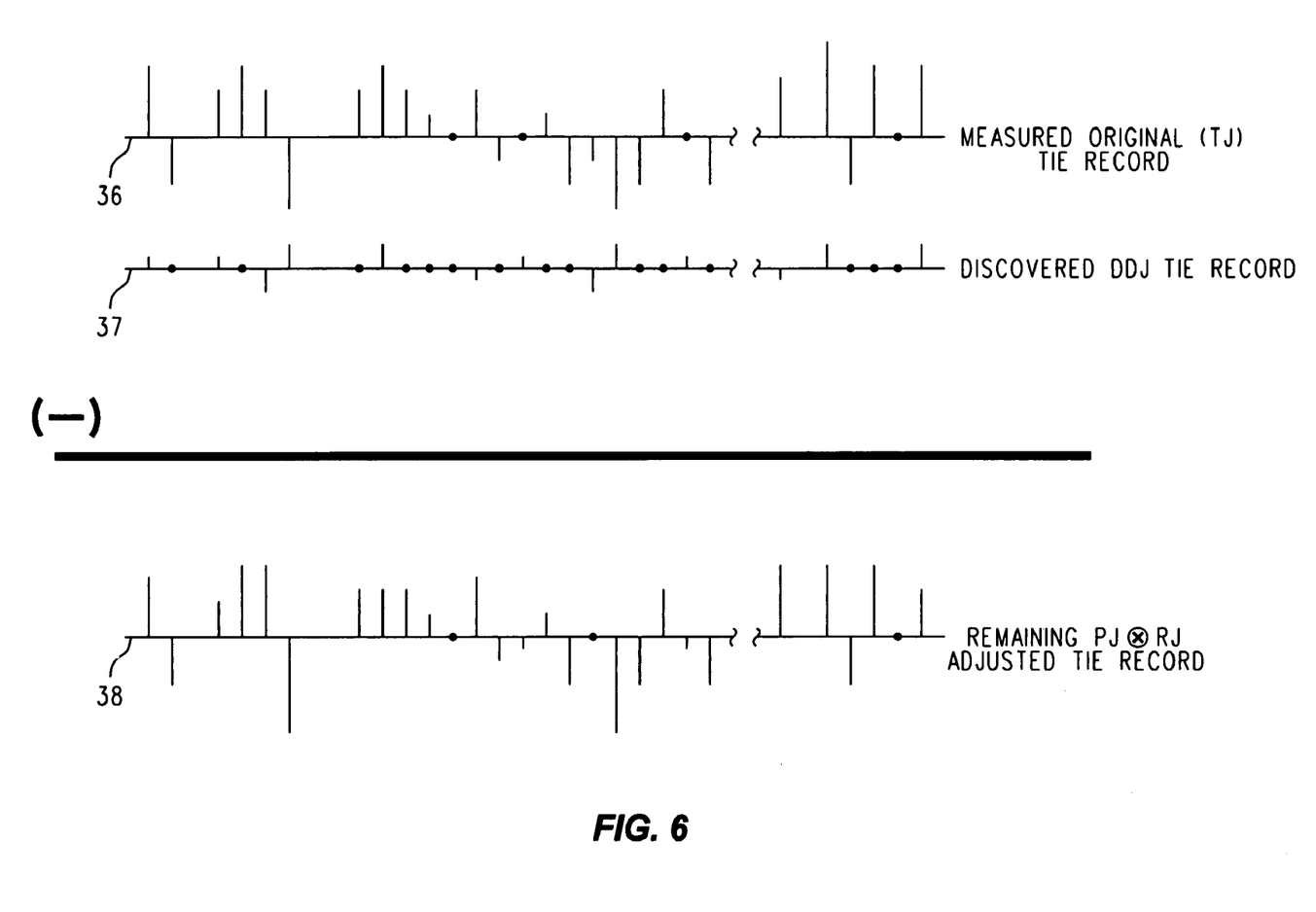
FIG. 6 is a diagram illustrating the notion of subtracting a Discovered DDJ TIE Record created using the Look Up Table of FIG. 5 in conjunction with the discovered bit pattern of the Test Pattern of FIG. 4 from the measured Original TJ TIE Record to produce an Adjusted TIE Record containing PJ convolved with RJ.

The LUT 33 of FIG. 5 gives us a powerful tool to remove DDJ from the complete Original TIE Record 28 of FIG. 4, as can be appreciated with reference now to FIG. 6. That complete Original TIE Record 28, it will be recalled, is actually a TIE record for TJ (36), and it has an entry for each edge in the arbitrary Test Pattern. Using the LUT 33 we can make a corresponding Discovered DDJ TIE Record 37 whose entries are solely DDJ for each edge. The edges in each case are the same edges, so these two TIE Records (28/36, 37) will be in one-to-one correspondence. We arrange to subtract each DDJ value from its corresponding TJ value to obtain a resulting Adjusted TIE Record 38 whose entries represent PJ$\otimes$RJ. THAT Adjusted TIE Record (38) can now be processed in a suitable manner (not discussed here) to separate PJ from RJ as part of a larger overall jitter analysis process.

Of course, the graphical style of subtraction shown in FIG. 6 is intended to promote an appreciation of what such a subtraction provides, what it means and why it works, more than suggesting that two stored images are somehow subjected to signed subtraction. In terms of actual implementation, what one can expect to find is a section of programming in an embedded system for jitter measurement and analysis that accesses corresponding entries in appropriate TIE data structures, forms their difference and stores those differences in yet another TIE data structure.

Now that the basic method has been set out for jitter measurement and analysis using timing jitter as an example, it is useful to discuss some additional considerations. First, we shall make some observations about Templates and Descriptors, about addressing the LUT, extensibility of DDJ measurements over larger amounts of data, and then about replacing the LUT with a computational rule. Finally, we shall describe what the similarities and differences are for measurement and analysis between timing jitter and voltage jitter.

As for Templates and their Descriptors, it will be noted that while we have given a few examples, we have not set out an entire collection of them and asserted that "These are the only tools that are frequently used . . . " To the contrary, we assume that a user interface within a jitter analysis system provides a way to specify the Template. It may well be the case that certain templates such as 'two before, at, and two after' and 'three before, at, and three after' are often enough used that they are provided as menu choices. On the other hand, it is also envisioned that a flexible 'do it yourself' mechanism is also provided, since it is understandable that in many cases the particular nature of the jitter is specific to circumstances in the system being investigated. The jitter analysis system might (as assumed above) compute all the Descriptors for a Template from a symbolic definition of that Template, or, a user might be obliged to construe the Template as an abstraction that only she knows about, and for which she must provide the Descriptors herself (if her jitter analyzer is a brand X economy model . . . ). This is, of course, an issue at the user interface level, and is one that we have not really addressed, since it is not, in and of itself, a part of the basic technique for actually finding DDJ. An example illustrating the utility of the 'do it yourself' mechanism might be one involving reflections. A knowledge of how internal busses were laid out and how they fed data to different items along their length would probably influence the choice of a Template intended to characterize reflection influenced DDJ. We would expect, then, that a suitable user interface would allow for variable numbers of bits to be specified, as well as their relative locations (contiguous or otherwise). Of course, a Template might be specified as independent bit values at certain locations relative to an edge of interest, or as bit locations where a particular kind of transition occurs. This last is a bit of an abstraction, to be sure, but it nevertheless reduces to a definite collection of possible bit sequences (Descriptors) that the bit pattern of the Acquisition Record can be investigated for.

It may be necessary to try several different Templates on the Acquisition Record to determine one that produces satisfactory results. That is, a trial Template that is too simple (say, 'two before, at, two after') for a state of affairs that is truly complex may give results that are significantly different from a seemingly similar Template (say, 'three before, at, three after'), while both the four before and after and the five before and after Templates produce results that are essentially in agreement. If we further suppose that an easy to use jitter analysis system is also equipped with a report generator that indicates the definition of the Template, shows the tabular results discovered for DDJ according to Descriptor, as well as perhaps some other indicators of performance or confidence (the number of instances and the variance associated with each Metric), such comparisons between results for trial Templates are, while maybe not fun, at least doable.

We have said in several places that the bit locations of interest in a Template need not be adjacent or contiguous. Suppose, for the sake of an example, that we are intent on using a ten-bit Template that has two groups of five adjacent bits (say, the later one in time—the 'victim,' as it were—is 'two before, at, two after' and the earlier one—the 'culprit'—is simply five consecutive bits) but where there are twenty bits between the two groups (say, we suspect mischief caused a reflection). Does this mean that the Template has to be thirty bits in all, and that an enormous amount of memory is needed to construct the LUT? Not at all! The intervening twenty bits are don't cares, and can be ignored in the encoding of the Descriptors. In this case the Descriptors would be just ten-bit patterns; five bits of pattern for each general region of interest. The twenty-bit separation is accounted for in the way the Acquisition Record is investigated, and is just an offset between two locations that provide data that, once obtained, can be treated as if it all came from a single place. Additional such 'separated regions' in a Template can account for more than one separate reflection or for subsequent re-reflections of an individual reflection.

It will also be appreciated that DDJ is expected to be essentially a property of the SUT and not of the data itself. (Bear in mind also that the answers we get depend strongly on the questions we ask, so the Template in use is a 'window' through which we view the DDJ landscape. We must always be mindful that the view we see is affected by the 'shape' of that window . . . . ) So, once a particular SUT has had its 'DDJ profile' (think: "LUT contents for a given Template we are inclined to trust") discovered using a suitable Test Pattern, that profile remains in force for all other data that the system might send or receive. Thus, if we are so inclined, we can obtain for that particular system a DDJ profile of interest just once and then use it to characterize amounts of DDJ that occur for other data without having to measure a new profile.

On the other hand, we may wish to increase the precision with which DDJ and the other types of jitter are found. One way to do this is to simply use a longer Test Pattern. However, we may be limited in that enterprise by the amount of memory that can be devoted to storing samples and a reconstruction of the waveform. Perhaps two (or more) separate measurements using the same Template can be combined to produce the same increase in precision. It turns out that this is possible. The first, and safest, way is to not discard the Descriptor TIE Records for the earlier measurement(s). Proceed to make a subsequent measurement and produce new Descriptor TIE Records. Upon reflection, it will be appreciated that respective instances of these for the same Descriptor can simply be merged into one Record! Now averages (Metrics for Descriptors) for a larger data set are produced, which, it can be argued, have greater precision. Another way is to simply average the contents of the LUTs that are produced for different measurements. This, however, produces an 'average of averages' that, as is well known, is not a correct average of the original data unless various precautions are taken (equal numbers of samples, etc.). However, with large enough data sets of roughly the same size that source of error might not be a serious concern.

We have used a LUT to serve as a data retrieval mechanism for data that have been discovered as related to a collection of Descriptors. Once the discovery is complete and the LUT is loaded, we index with a Descriptor and out pops a Metric. Other retrieval mechanisms are possible. The LUT could be replaced with a closed form computational rule that used as its input variables an ordered numerical representation of the various Descriptors, and that when evaluated produced the Metric that would otherwise have been stored in the LUT for the corresponding Descriptor. Such a computational rule can be found with conventional curve fitting techniques once the various Metrics have been found and the various Descriptors arranged or encoded to serve as a suitable independent variable. (A table having ten-bit Descriptors might, in principle, have a replacement system of linear functions whose independent variables are those ten bits or one of some other form having a single integer variable ranging from zero to one thousand twenty-three.) It will be noted that this particular scheme for replacing the LUT is essentially an alternate form of retrieval of that which has already been found, and that it does not afford any significant additional analysis of the nature of the jitter. That is, if you looked at the equations found to compute the Metrics, you likely would not learn anything you didn't already know from a thoughtful inspection of the tabular results that would otherwise be in the LUT.

Let's consider another application of the jitter measurement mechanisms that we have described. We have so far dealt with timing jitter in edges measured by sampling oscillographic techniques. That is, it has been necessary to reconstruct with DSP techniques the actual trajectory of the waveform from samples that were taken at known times. From that we infer the times of transition, and from those the various Acquisition and TIE Records. That such inferences are valid is the intellectual underpinning of modern DSOs. But there is another architecture for a digital instrument that measures digital waveforms. It is perhaps not as popular as it once was, but it still exists: the Timing Analyzer (TA). A Timing Analyzer does not digitize a waveform in the usual sense. It characterizes its amplitude as being above or below a threshold that separates the logic values of ONE and ZERO. It can, however, report when along a time axis these transitions occurred, just as a DSO does.

A Timing Analyzers doesn't usually have the robust time axis capability that a high end DSO would have, but it certainly could have. Most TA's look at many channels of input data simultaneously, say enough to characterize an entire bus. They can have very sophisticated threshold detection mechanisms, and if it were desired we could send the TA a Test Pattern and arrange to measure, for each signal in a collection (bus) of signals, a stream of logic values and their times of transitions. That is, for each signal we would have an Acquisition Record reporting a logic value/time of transition that could be processed into an associated collection of TIE Records that are each processed for timing jitter as described above. Now we could have simultaneous jitter measurements for the signals belonging to a bus.

Figure 7:
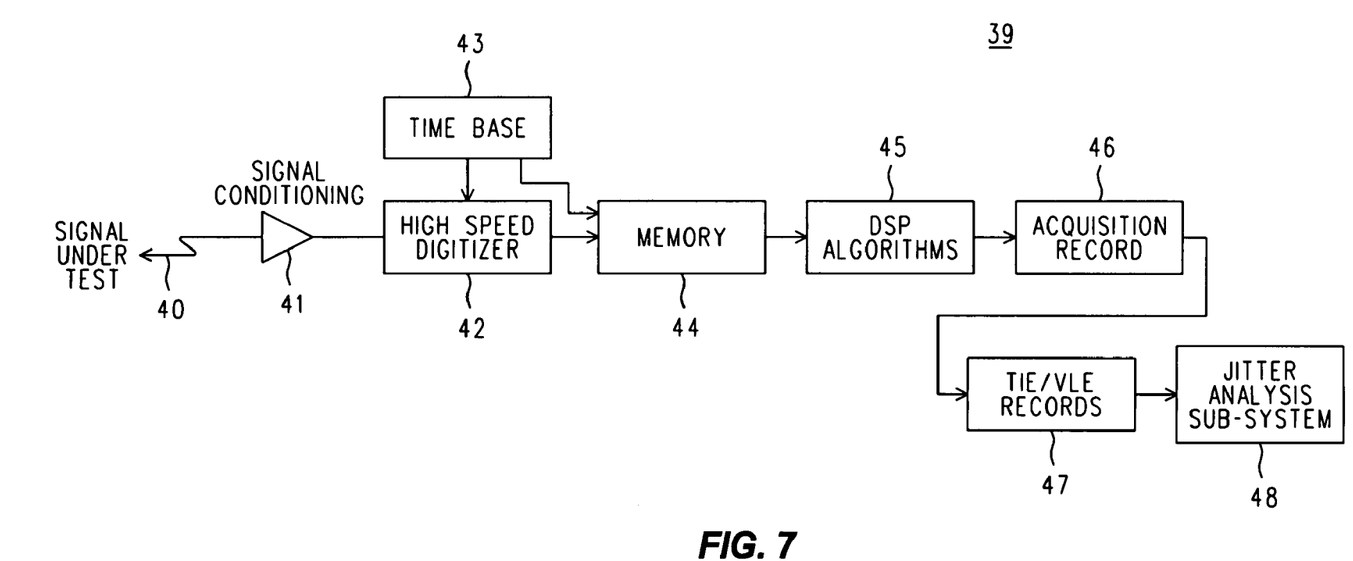
FIG. 7 is a simplified block diagram illustrating a real time DSO hardware environment within which the invention may be practiced.
Figure 8:
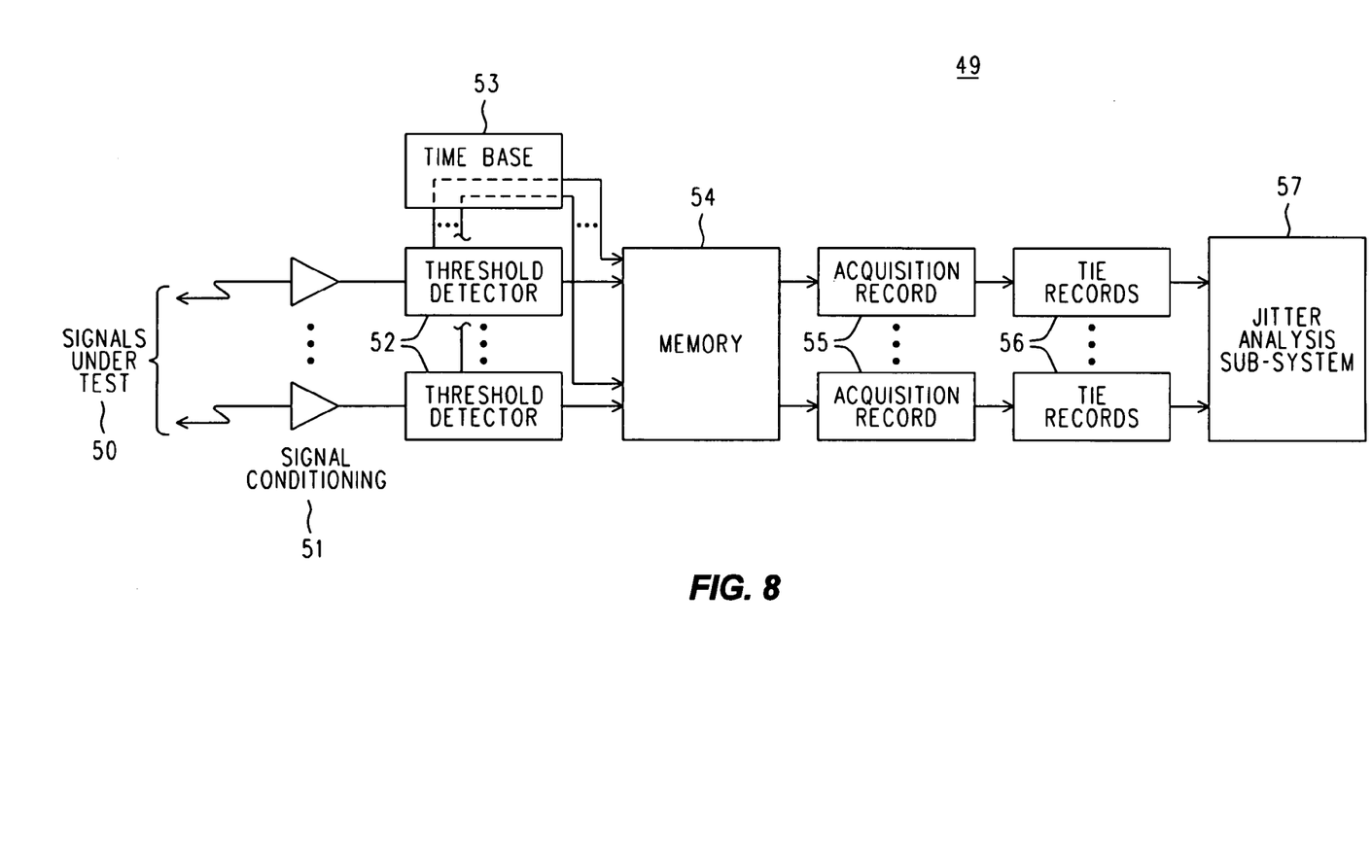
FIG. 8 is a simplified block diagram illustrating a Timing Analyzer hardware environment within which the invention may be practiced.

FIGS. 7 and 8 illustrate the difference between the DSO and TA approaches to jitter analysis. In particular, FIG. 7 is a very simplified block 39 diagram of a DSO that is equipped to perform the type of jitter analysis described herein.

In FIG. 7 a Signal Under Test 40 is probed and after Signal Conditioning (41) is applied to a High Speed Digitizer 42. It performs high speed analog to digital conversion with sufficient resolution (say, eight or ten bits) at a suitable rate. The Digitizer 42 operates in a periodic manner asynchronous with the data and in conjunction with a Time Base 43, such that the samples taken are supplied, along with an indication of when they occurred, as (voltage, time) pairs to a Memory 44. We have suppressed all details connected with the issue of triggering, as what is shown is sufficient to support the notion of acquiring a waveform. The acquired waveform that is stored in the memory is processed by the DSP Algorithms 45 to become an Acquisition Record 46, which is also depicted in FIG. 4 (26). The Acquisition Record is formed into a TIE/VLE Record 47, and then processed as described above by a Jitter Analysis Sub-System 48.

FIG. 8 is a very simplified block diagram 49 of a Timing Analyzer that has been adapted to perform the type of jitter analysis described above. In FIG. 8 a collection 50 of Signals Under Test is probed and after Signal Conditioning 51 are applied to a collection of Threshold Detectors 52. Each Threshold Detector operates asynchronously and independently to signal when its applied input meets the voltage levels that define the logic values in use. Each Threshold Detector also cooperates with a Time Base 53 so that the occurrence of a transition and its time of occurrence are available as a unit of information that can be stored in a Memory 54. This Memory would likely be an elaborate multiport affair with provisions to correctly handle the simultaneous and near simultaneous occurrence of many such transition/time pairs. This sort of thing is what Timing Analyzers do, and is believed to be conventional. We note that it may be desirable to use a more robust Time Base than is usual, if the jitter analysis is to be comparable to that obtainable with a DSO. In any event, once the transition/time data is stored in the Memory 54, an Acquisition Record 55 can be produced for each channel, along with corresponding TIE Records 56. The Jitter Analysis Sub-System 57 is essentially the same as System 48 of FIG. 7, save that System 57 of FIG. 8 handles more channels of data, and might not be capable of creating VLE Records (since a TA has hardware threshold comparison ability, but does not have an Analog to Digital Converter (ADC) for digitizing).

A Timing Analyzer or a multi-channel DSO that characterizes the jitter of parallel bits arriving over a parallel bus can measure Data Dependent Skew (DDS) instead of DDJ. We shall need one set of Acquisition Records 26 and associated respective TIE/VLE Records 28 and 29-32 for each channel of the bus. The parameter for the skew could be either the difference between the earliest and latest edges of an arriving pattern, or it could be the RMS value of all the bits, or it could be just for a selected bit, or individual one of any or all of the bits. Averaged parameters for a Descriptor will produce a Metric, as before. But now we have an extra dimension (bus width) within which to define the Descriptors. A Descriptor can now be thought of as a location in a two dimensional matrix that is the width of the bus in one dimension and the number and location of the clock cycles of the bus for which parameters (the raw data) are observed. Now we need a larger LUT that mimics that matrix, in that we can index it with all the different combinations. We note that there is a temptation to use two LUTs, each separately indexed by one dimension. Such a short-cut will likely prove unsatisfactory, since the 'Data Dependence' of the DDS is likely operative in both dimensions. (These dimensions are Descriptors for earlier and later in time, as already discussed, and similar Descriptors for conditions back and forth across the width of the bus).

This means that it is the combination of circumstances that influences the outcome, and that neither of the two portions of the complete Descriptor are likely to be the sole independent variable upon which the outcome depends.

The timing of transitions is not the only parameter in a digital signal that is susceptible to jitter. Let us return to the DSO environment with which we began. If we were to examine a waveform of a digital signal we would discover that a ONE is not always the same steady voltage from one instance to the next, nor is a ZERO always the same voltage. It turns out that these voltage variations (noise) can have the same general paradigm of FIG. 1 applied to them as was done for timing jitter of FIG. 3, only now the ususal term for the variation is voltage noise. So, let us pick a standardized location within a UI to make a voltage measurement, say right in the middle of the UI. Just as we used DSP techniques to reconstruct the actual waveform and infer the actual time of transition when we didn't actually sample there, we can also use DSP techniques to infer the actual voltage at the middle of the UI, even if we didn't actually take a sample at that time. Now we simply use these voltage values in place of what were previously time of transition values, and perform the exact same jitter analysis of FIGS. 4, 5 and 6, beginning with forming an Error Record for all the bits in the Test Pattern. In this case, that Error Record is a complete Original VLE (Voltage Level Error) Record (corresponds to 28 of FIG. 4). There may be some choice as to how to determine what voltage value is correct, or, what any 'error' is relative to. One might specify an exact correct value, a range of satisfactory values, or, a suitable average could be selected as a correct value. We would need such a choice to instantiate the notion of Voltage Level Error to produce a measured quantity (i.e., a voltage error). But as far as the jitter measurements on VLE Records are concerned, it is in every way a substitution of variables; voltage error for time error. We then proceed to produce a collection of Descriptor VLE Records (corresponding to 29-32 of FIG. 4), and extract DDJ (which is now a voltage) as in Step V of FIG. 4. Those extracted or discovered DDJ values are then loaded into the LUT 33 of FIG. 5, and the subtraction of FIG. 6 proceeds as usual, save that a Discovered DDJ VLE Record is subtracted from a measured Original (TJ) VLE Record to produce a remaining PJ⊗RJ Adjusted VLE Record.

Figure 9:
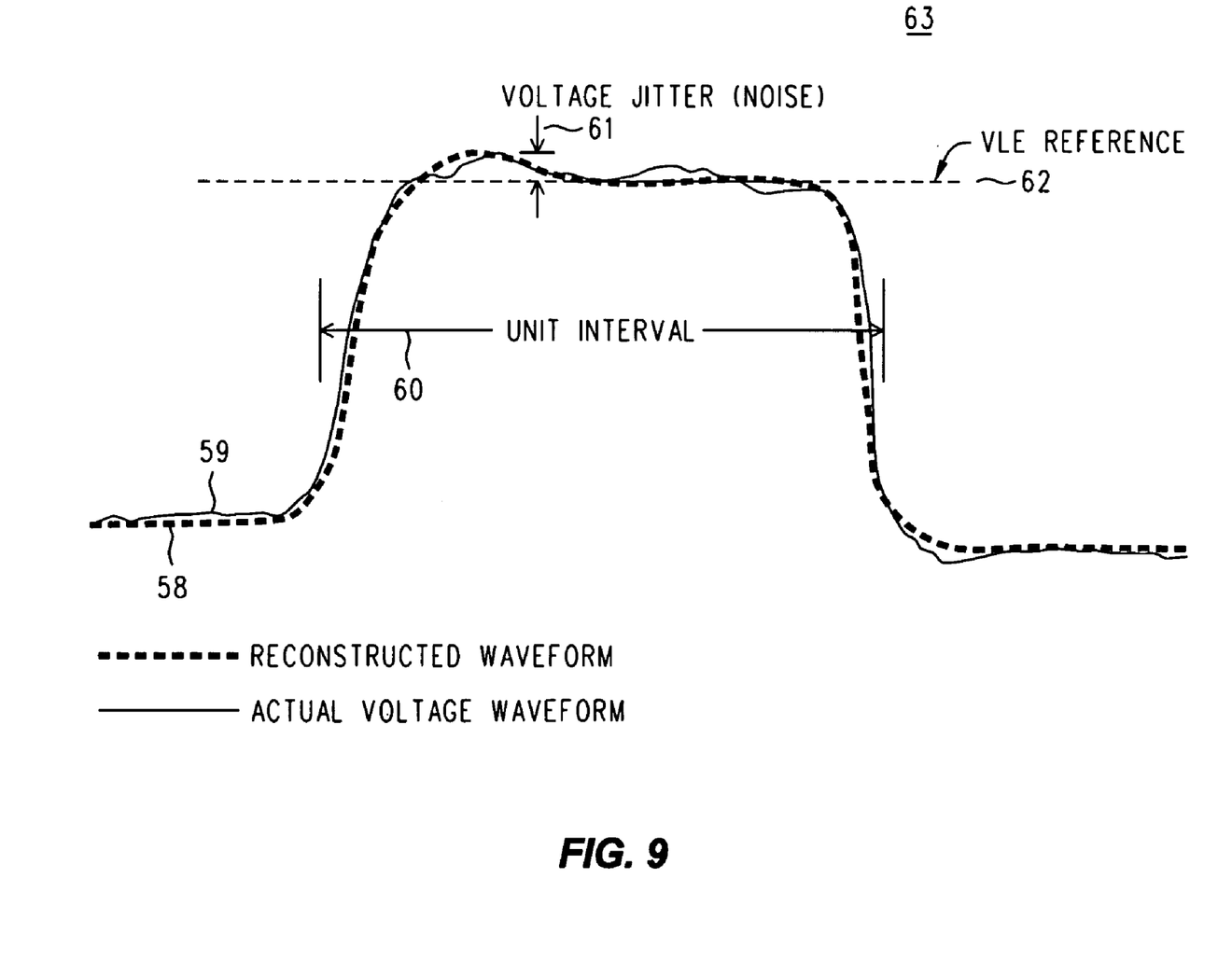
FIG. 9 is a diagram illustrating that the invention may be used to characterize voltage jitter (noise).

Thus, we see in FIG. 9 an instance 63 of one Unit Interval 60 of some actual signal 59 of interest and its reconstruction 58 after sampling. Once a suitable VLE reference 62 has been specified or automatically determined, the reconstructed waveform 58 can be inspected (it is, after all, just a sequence of values in memory) to determine the amount of Voltage Jitter (noise) 61 that is present. From there, VLE Records are produced, and used in place of the TIE Records during a jitter analysis, as described above.

We claim:

1. A method of measuring Data Dependent Jitter for a digital signal in a System Under Test, comprising the steps of:
   (a) processing consecutively sampled values of an instance of an arbitrary Test Pattern in the digital signal to produce an Acquisition Record;
   (b) measuring times of occurrence of consecutive edges in the Acquisition Record to form a corresponding Original Time Interval Error Record;
   (c) specifying, via a Template, a collection of Descriptors of digital signal behaviors with which amounts of Data Dependent Jitter are to be associated, the Template specifying at least one bit position or signal value transition that is both A) not adjacent to a reference bit location or signal value transition of the Template, and B) not contiguous with a set of bit positions or signal value transitions of the Template that include a bit position or signal value transition that is adjacent to the reference bit location or signal value transition of the Template;
   (d) inspecting the Acquisition Record of Step (a) to find instances of a selected Descriptor chosen from among those specified in Step (c);
   (e) identifying in the Original Time Interval Error Record a respective Time Interval Error value associated with each instance of the selected Descriptor found in Step (d);
   (f) subsequent to an instance of Step (e), finding a Metric that is the average of the Time Interval Errors values associated with the found instances of the selected Descriptor in Step (d);
   (g) repeating Steps (d), (e) and (f) for a different selected Descriptor until Steps (d), (e) and (f) have been performed for at least two Descriptors in the collection thereof specified in Step (c); and
   (h) storing each Metric found in Step (f) in a table indexed by the selected Descriptor for which it was found.

2. A method as in claim 1 further comprising the steps of:
   (i) selecting an edge of interest in a work digital signal applied to the System Under Test;
   (j) identifying a Descriptor associated with the edge selected in Step (i);
   (k) indexing the table of Step (h) with the Descriptor identified in Step (j); and
   (l) retrieving from the table of Step (h) a Metric stored therein at the location indexed by Step (k).

3. A method as in claim 1 further comprising the steps of:
   (i) creating a Discovered DDJ Time Interval Error Record by associating a respective Descriptor with each consecutive edge in the Acquisition Record of Step (a), and populating the Discovered DDJ Time Interval Error Record with consecutive Metrics obtained by indexing the table of Step (h) with the respective Descriptors of this Step (i);
   (j) subtracting each entry in the Discovered DDJ Time Interval Error Record of Step (i) from a corresponding respective entry in the Original Time Interval Error Record of Step (b); and
   (k) storing in an Adjusted Time Interval Error Record the consecutive differences produced by the subtractions of Step (j).

4. A method as in claim 1 further comprising the steps of:
   (i) processing consecutively sampled values of an instance of an arbitrary Work Pattern in the digital signal to produce a Work Acquisition Record;
   (j) creating a Discovered Work Time Interval Error Record by measuring times of occurrence for consecutive edges in the Work Acquisition Record;
   (k) creating a Discovered DDJ Time Interval Error Record by associating a respective Descriptor with each consecutive edge in the Work Acquisition Record, and populating the Discovered DDJ Time Interval Error Record with consecutive Metrics obtained by indexing the table of Step (h) with the respective Descriptors of this Step (k);
   (l) subtracting each entry in the Discovered DDJ Time Interval Error Record of Step (k) from a corresponding respective entry in the Discovered Work Time Interval Record of Step (j); and (m) storing in an Adjusted Work Time Interval Error Record the consecutive differences produced by the subtractions of Step (l).

5. A method as in claim 1 wherein the arbitrary Test Pattern is pseudo random data.

6. A method as in claim 1 wherein the arbitrary Test Pattern is actual data occurring in the System Under Test during normal operation thereof.

7. A method as in claim 1 wherein the collection of Descriptors includes a selected collection of bit values at bit positions of interest in a specified relation to a reference bit location.

8. A method as in claim 1 wherein the collection of Descriptors includes a selected collection of specified signal value transitions at bit positions of interest in a specified relation to a reference bit location.

9. A method of measuring Data Dependent Jitter for a digital signal in a System Under Test, comprising the steps of:
(a) processing consecutively sampled values of an instance of an arbitrary Test Pattern in the digital signal to produce an Acquisition Record;
(b) measuring times of occurrence of consecutive edges in the Acquisition Record to form a corresponding Original Time Interval Error Record;
(c) specifying, via a Template, a collection of Descriptors of digital signal behaviors with which amounts of Data Dependent Jitter are to be associated, the Template specifying at least one bit position or signal value transition that is both A) not adjacent to a reference bit location or signal value transition of the Template. and B) not contiguous with a set of bit positions or signal value transitions of the Template that include a bit position or signal value transition that is adjacent to the reference bit location or signal value transition of the Template;
(d) inspecting the Acquisition Record of Step (a) to find instances of a selected Descriptor chosen from among those specified in Step (c);
(e) identifying in the Original Time Interval Error Record a respective Time Interval Error value associated with each instance of the selected Descriptor found in Step (d):
(f) subsequent to an instance of Step (e), finding a Metric that is the average of the Time Interval Errors values associated with the found instances of the selected Descriptor in Step (d);
(g) repeating Steps (d), (e) and (f) for a different selected Descriptor until Steps (d), (e) and (f) have been performed for at least two Descriptors in the collection thereof specified in Step (c);
(h) storing each Metric found in Step (f) in a table indexed by the selected Descriptor for which it was found; and
(i) choosing the Template based on a bus layout.

10. A method of measuring Data Dependent Jitter for a digital signal in a System Under Test, comprising the steps of:
(a) specifying a collection of Descriptors of digital signal behaviors with which amounts of Data Dependent Jitter are to be associated;
(b) processing consecutively sampled values of an instance of a first Arbitrary Pattern in the digital signal to produce a first Acquisition Record;
(c) measuring times of occurrence of consecutive edges in the first Acquisition Record to form a corresponding first Original Time Interval Error Record;
(d) inspecting the first Acquisition Record of Step (b) to find instances of a first selected Descriptor chosen from among those specified in Step (a);
(e) identifying in the first Original Time Interval Error Record a respective Time Interval Error value associated with each instance of the first selected Descriptor found in Step (d);
(f) subsequent to an instance of Step (e), finding a first Metric that is the average of the Time Interval Errors values associated with the found instances of the first selected Descriptor in Step (d);
(g) repeating Steps (d), (e) and (f) for a different first selected Descriptor until Steps (d), (e) and (f) have been performed for all Descriptors in the collection thereof specified in Step (a);
(h) processing consecutively sampled values of an instance of a second Arbitrary Pattern in the digital signal to produce a second Acquisition Record;
(i) measuring times of occurrence of consecutive edges in the second Acquisition Record to form a corresponding second Original Time Interval Error Record;
(j) inspecting the second Acquisition Record of Step (h) to find instances of a second selected Descriptor chosen from among those specified in Step (a);
(k) identifying in the second Original Time Interval Error Record a respective Time Interval Error value associated with each instance of the second selected Descriptor found in Step (j);
(l) subsequent to an instance of Step (k), finding a second Metric that is the average of the Time Interval Errors values associated with the found instances of the second selected Descriptor in Step (j);
(m) repeating Steps (j), (k) and (l) for a different second selected Descriptor until Steps (j), (k) and (l) have been performed for all Descriptors in the collection thereof specified in Step (a);
(n) for each Descriptor, averaging the first Metric associated with that each Descriptor with a the second Metric associated with that same each Descriptor, to generate an average of Metrics for that same each Descriptor; and
(o) storing each average of Metrics found in Step (n) in a table indexed by an associated Descriptor for which it was found.

11. A method of measuring Data Dependent Skew of parallel bits arriving over parallel channels of a parallel bus in a System Under Test, comprising the steps of:
(a) processing consecutively sampled values of digital signals received over the parallel channels, to produce an Acquisition Record for each of the parallel channels;
(b) measuring times of occurrence of consecutive edges in each of the Acquisition Records, to form corresponding Original Time Interval Error Records for each of the parallel channels;
(c) specifying a collection of Descriptors of digital signal behaviors with which amounts of Data Dependent Jitter are to be associated;
(d) inspecting the Acquisition Records of Step (a) to find instances of a selected Descriptor chosen from among those specified in Step (c);
(e) identifying in the Original Time Interval Error Records a respective Time Interval Error value associated with each instance of the selected Descriptor found in Step (d);
(f) subsequent to an instance of Step (e), and for each of the parallel channels, finding a Metric that is the average of the Time Interval Errors values associated with the found instances of the selected Descriptor in Step (d);
(g) repeating Steps (d), (e) and (f) for a different selected Descriptor until Steps (d), (e) and (f) have been performed for at least two Descriptors in the collection thereof specified in Step (c);
(h) storing each Metric found in Step (f) in a table indexed by the selected Descriptor for which it was found;
(i) indexing the table of step (h) with a plurality of Descriptors associated with a set of parallel bits, to retrieve Metrics for the set of parallel bits; and
(j) using the retrieved Metrics for the set of parallel bits to measure DataDependent Skew of the set of parallel bits.

* * * * *

UNITED STATES PATENT AND TRADEMARK OFFICE
CERTIFICATE OF CORRECTION

| | |
|---|---|
| PATENT NO. | : 7,480,329 B2 |
| APPLICATION NO. | : 10/978103 |
| DATED | : January 20, 2009 |
| INVENTOR(S) | : Draving et al. |

It is certified that error appears in the above-identified patent and that said Letters Patent is hereby corrected as shown below:

In column 16, line 60, in Claim 4, delete "(in)" and insert -- (m) --, therefor.

In column 17, line 33, in Claim 9, delete "(d):" and insert -- (d); --, therefor.

In column 18, line 64, in Claim 11, delete "DataDependent" and insert -- Data Dependent --, therefor.

Signed and Sealed this

Fifth Day of May, 2009

JOHN DOLL
*Acting Director of the United States Patent and Trademark Office*